United States Patent
Deng et al.

(10) Patent No.: US 7,561,190 B2
(45) Date of Patent: Jul. 14, 2009

(54) METHOD AND SYSTEM TO REDUCE FLICKER ARTIFACTS IN CAPTURED IMAGES

(75) Inventors: Yining Deng, San Mateo, CA (US); Ping Wah Wong, Sunnyvale, CA (US); Hugh Phu Nguyen, San Jose, CA (US)

(73) Assignee: Nethra Imaging Inc., Santa Clara, CA (US)

( * ) Notice: Subject to any disclaimer, the term of this patent is extended or adjusted under 35 U.S.C. 154(b) by 352 days.

(21) Appl. No.: 11/407,455

(22) Filed: Apr. 19, 2006

(65) Prior Publication Data

US 2007/0247531 A1 Oct. 25, 2007

(51) Int. Cl.
*H04N 9/73* (2006.01)
(52) U.S. Cl. .................................................. 348/226.1
(58) Field of Classification Search ............. 348/226.1, 348/241, 227.1, 370
See application file for complete search history.

(56) References Cited

U.S. PATENT DOCUMENTS

| 6,519,002 | B1 * | 2/2003 | Tomaszewski | 348/226.1 |
| 2002/0097328 | A1 * | 7/2002 | Henderson et al. | 348/241 |
| 2003/0030744 | A1 * | 2/2003 | Baer | 348/370 |
| 2004/0179114 | A1 * | 9/2004 | Silsby et al. | 348/226.1 |
| 2004/0201729 | A1 * | 10/2004 | Poplin et al. | 348/226.1 |

* cited by examiner

*Primary Examiner*—John M Villecco
*Assistant Examiner*—Tuan H Le
(74) *Attorney, Agent, or Firm*—Hahn and Moodley LLP

(57) ABSTRACT

In one embodiment, a method for controlling artifacts in an image due to a presence of flicker in ambient light is provided. The method comprises determining a power frequency for the ambient light; determining a magnitude and phase of flicker fluctuation in the image due to the flicker; and adjusting the image for the flicker fluctuation based on the power frequency, magnitude, and phase.

19 Claims, 3 Drawing Sheets

METHOD AND SYSTEM TO REDUCE FLICKER ARTIFACTS IN CAPTURED IMAGES

FIELD

Embodiments of the invention relate to a method and system to reduce flicker artifacts in a captured image.

BACKGROUND

The instantaneous alternating current (AC) power is a continuously varying sinusoidal wave. Therefore, the instantaneous light intensity function of a lamp also varies accordingly and can be modeled as:

$$I'(t)=I+A|\cos[\omega(t+\theta)]| \qquad (1)$$

where I' is the observed instantaneous light intensity, I is a constant term respect to time, $A|\cos[\omega(t+\theta)]|$ is a varying term and is due to temporal fluctuations in ambient light, A is a constant, $\omega=2\pi f$ is the power frequency at either 50 Hz or 60 Hz, t is the time, and $\theta$ is the initial phase. The varying term causes artifacts in a captured image. This phenomenon is known as light flicker. I'(t) is a periodic function. Because of the absolute term, its period is 1/(2f), half of the cosine period.

Light flicker could cause noticeable artifacts during image and video capture. This is because the image pixel value is proportional to the integral of the instantaneous light function:

$$Y(\alpha, T) = \int_{\alpha-\theta}^{\alpha-\theta+T} [I + A|\cos(\omega(t+\theta))|] dt = \int_{\alpha}^{\alpha+T} [I + A|\cos(\omega t)|] dt \qquad (2)$$

where $\alpha-\theta$ is the starting time or the initial phase, T is the integration time or the camera exposure time, Y is the captured image pixel value. $Y(\alpha,T)$ has a period of $\tau=\frac{1}{2}f$ with respect to T, where $\tau$ is the half of the power frequency period. From this equation, it can be seen that the Y value changes as a function of $\alpha$, except when T is an integer multiple of $\tau$, 1/(2f). In that case, the Y value stays the same regardless of the initial phase $\alpha$.

Depending on a camera's shutter mechanism, the light flicker causes various artifacts in the image, if T is not set to an integer number of the period $\tau$. There are two popular types of shutters, namely snapshot and rolling shutter. In the snapshot case, all rows in the image are exposed at the same starting and ending time. If a sequence of video frames or still images is captured in the snapshot mode, each frame is exposed at a different time. Pixel values then vary from frame to frame even if the scene is static, which is easily noticeable during video playback.

In the rolling shutter case, only a number of rows are exposed at any given time. Imagine an exposure window that covers the exposed rows. The width of the window is the number of rows. The window moves one row at a time from the top to the bottom, and then rotates back to the top. At each window location, pixel values in the longest exposed row are read out. The exposure time is $n\beta$, where n is the number of rows in the window and $\beta$ is the time difference between the read-outs of two consecutive rows. $\beta$ is usually constant within each image. Because each row is exposed at a different starting time, the pixel values shift from row to row. The net effect is a vertical periodic signal being superimposed on the original image. FIG. 1 illustrates this effect. The image is generated based on Equation (2). A constant I is used for all the pixel location. In other words, without the flicker, the image should be flat. Due to the flicker, sinusoidal variations along the vertical direction can be observed When the magnitude of the fluctuation A is small, the bright and dark stripes in FIG. 1 are less noticeable in a single image. However, in a sequence of video frames, because of the phase difference between two consecutive frames, the bright and dark stripes move from frame to frame and are thus more noticeable.

One method to correct for flicker artifacts in a captured image is to set the exposure time T to an integer number of the period, 1/(2f). However, with this method the allowable exposure time is constrained to a fixed set of values. In the example of 60 Hz power line, they are: $\frac{1}{120}$ s, $\frac{2}{120}$ s, $\frac{3}{120}$ s. Any values between those numbers would not be allowed. Moreover the exposure time cannot be set to be smaller than $\frac{1}{120}$ s without avoiding the flicker.

SUMMARY

In one embodiment, a method for controlling artifacts in an image due to a presence of flicker in ambient light is provided. The method comprises determining a power frequency for the ambient light; determining a magnitude and phase of flicker fluctuation in the image due to the flicker; and adjusting the image for the flicker fluctuation based on the power frequency, magnitude, and phase.

Other aspects of the invention will be apparent from the detailed description below.

BRIEF DESCRIPTION OF THE DRAWINGS

Embodiments of the invention will now be described, by way of example, with reference to the accompanying diagrammatic drawings, in which.

DETAILED DESCRIPTION

In the following description, for purposes of explanation, numerous specific details are set forth in order to provide a thorough understanding of the invention. It will be apparent, however, to one skilled in the art, that the invention may be practiced without these specific details. In other instances, structures and devices are shown at block diagram form only in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the present invention disclose techniques reducing or removing light flicker artifacts in captured images, regardless of whether the images are still images or video images. The techniques are designed for rolling shutter cameras. In one embodiment, there are three steps. The first step is to determine the AC power frequency, e.g. 50 Hz or 60 Hz. The second step is to determine the magnitude and the phase of the flicker fluctuation in captured images, given the power frequency. The third step reduces or removes the flicker artifacts from the images based on the determined power frequency, magnitude, and phase. Advantageously, the exposure time T need not be limited to an integer number of the period, $1/(2f)$.

Embodiments of the present invention also cover an image processor that implements the techniques of the present invention. A camera system that includes an image processor that implements the techniques of the present invention is also covered.

Figure 1:
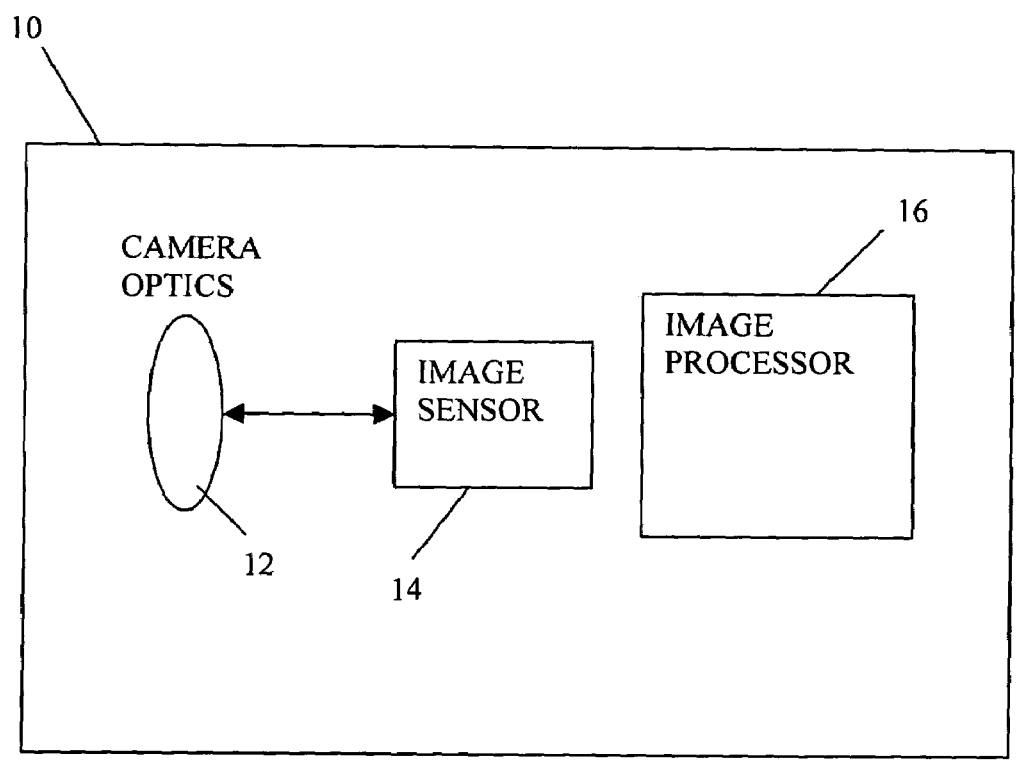
FIG. 1 show a high-level block diagram of a camera system, in accordance with one embodiment of the invention.
Figure 2:
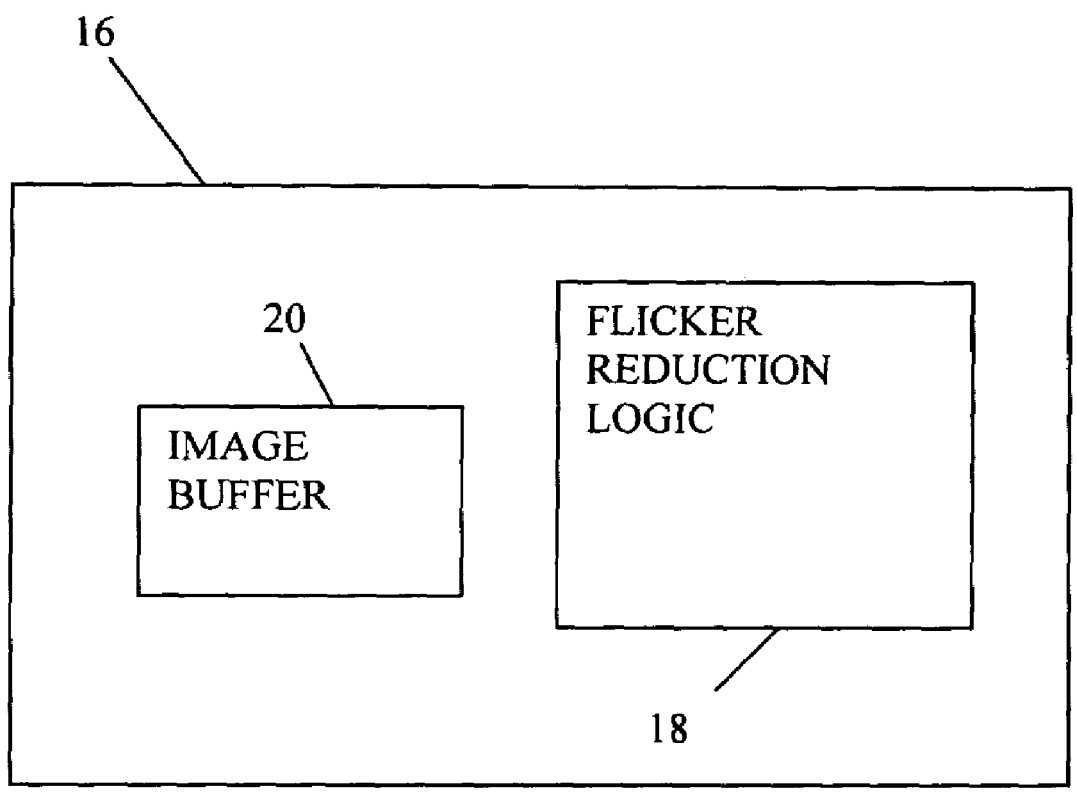
FIG. 2 shows a high-level block diagram of an image processor, in accordance with one embodiment of the invention.

Turning now to FIG. 1 of the drawings, there is shown a camera system 10 in accordance with one embodiment of the invention. The camera system 10 includes camera optics 12 coupled to an image sensor 14. The image sensor 14 is in turn coupled to an image processor 16. As will be seen from FIG. 2 of the drawings, the image processor 16 includes flicker reduction logic 18, and an image buffer 20, among other components that have not been shown so as not to obscure the invention, but which components one of ordinary skill in the art would understand to form part of the image processor 16. The flicker reduction logic 18 may be implemented in software, hardware, or a combination of both software and hardware. One function of the flicker reduction logic 18 is to process an image captured by the image sensor 14, thereby to at least reduce flicker artifacts in the image due to ambient light.

The techniques to reduce flicker reduction in captured images are based on the Equation (2). Since $Y(\alpha,T)$ as defined in Equation (2) has period of $\pi/\omega$ with respect to T, in one embodiment it is assumed that $0 < T \leq \pi/\omega \cdot Y(\alpha)$ may be evaluated to the following four cases, in one embodiment of the invention:

1A. $I \cdot t_\alpha^{\alpha+T} + \int_\alpha^{\frac{\pi}{2\omega}} A[\cos(\omega t)] dt + \int_{\frac{\pi}{2\omega}}^{\alpha+T} A[-\cos(\omega t)] dt,$ $\alpha < \frac{(4k+1)\pi}{2\omega} < \alpha + T$ 1B. $I \cdot t_\alpha^{\alpha+T} + \int_\alpha^{\frac{3\pi}{2\omega}} A[-\cos(\omega t)] dt + \int_{\frac{3\pi}{2\omega}}^{\alpha+T} A[\cos(\omega t)] dt,$ $\alpha < \frac{(4k+3)\pi}{2\omega} < \alpha + T$ 2A. $I \cdot t_\alpha^{\alpha+T} + \int_\alpha^{\alpha+T} A[\cos(\omega t)] dt,$ $\frac{(4k-1)\pi}{2\omega} \leq \alpha < \alpha + T \leq \frac{(4k+1)\pi}{2\omega}$ 2B. $I \cdot t_\alpha^{\alpha+T} + \int_\alpha^{\alpha+T} -A[\cos(\omega t)] dt,$ $\frac{(4k+1)\pi}{2\omega} \leq \alpha < \alpha + T \leq \frac{(4k+3)\pi}{2\omega}$ In on embodiment, $Y(\alpha,T)$ may be evaluated to the following:

1A. $I \cdot T + \frac{A}{\omega}(2 - \sin(\omega\alpha) - \sin(\omega\alpha + \omega T))$ -continued 1B. $I \cdot T + \frac{A}{\omega}(2 + \sin(\omega\alpha) + \sin(\omega\alpha + \omega T))$ 2A. $I \cdot T + \frac{A}{\omega}(\sin(\omega\alpha + \omega T) - \sin(\omega\alpha))$ 2B. $I \cdot T + \frac{A}{\omega}(-\sin(\omega\alpha + \omega T) + \sin(\omega\alpha))$ In one embodiment 1A and 1B may be combined, and 2A and 2B may be combined as:

Case 1:

$Y(\alpha, T) = I \cdot T + \frac{A}{\omega}(2 - |\sin(\omega\alpha) - \sin(\omega\alpha + \omega T)|),$ $\frac{2k\pi}{2\omega} \leq \alpha < \frac{(2k+1)\pi}{2\omega} < \alpha + T \leq \frac{(2k+2)\pi}{2\omega}$ Case 2:

$Y(\alpha, T) = I \cdot T + \frac{A}{\omega}|\sin(\omega\alpha + \omega T) - \sin(\omega\alpha)|,$ $\frac{(2k-1)\pi}{2\omega} \leq \alpha < \alpha + T \leq \frac{(2k+1)\pi}{2\omega}$ It is to be observed that the first term IT is a constant term with respect to time while the second term is the sinusoidal term. Moreover, when $T = k\pi/\omega$ where k is an integer, both 1 and 2 may be evaluated to:

$$Y(\alpha, T) = I \cdot T + 2A/\omega, \quad T = \frac{k\pi}{\omega} \quad (3)$$

Equation (3) confirms that when $T = k\pi/\omega$, $Y(\alpha,T)$ is a constant function with respect to $\alpha$, the initial time.

Figure 3:
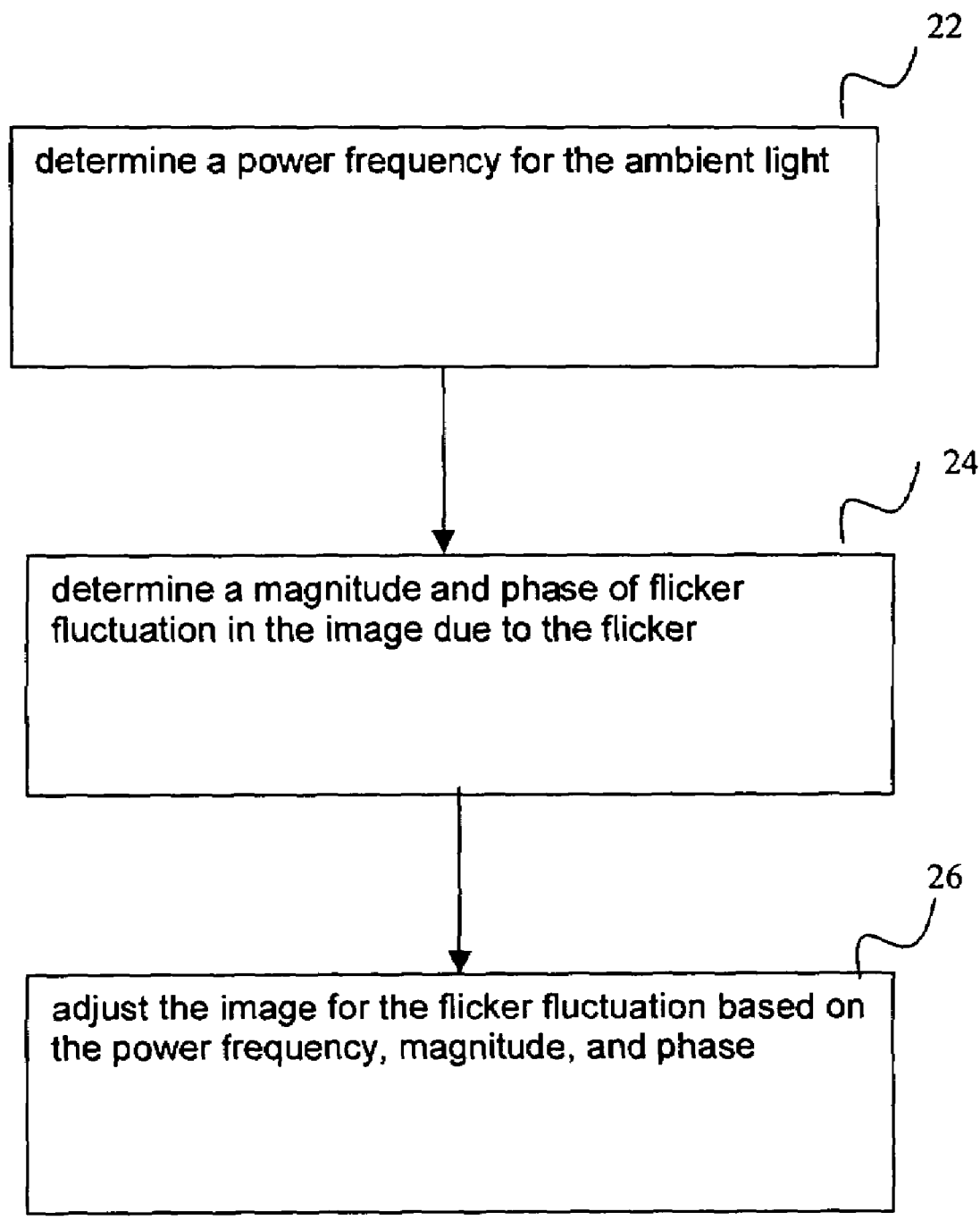
FIG. 3 shows a flowchart for a flicker reduction technique, in accordance with one embodiment of the invention

Turning now to FIG. 3 of the drawings, there is shown a flowchart of the flicker reduction technique performed by the image processor 16, in accordance with one embodiment of the invention. As will be seen, at block 22 the power frequency for the ambient light is determined. Thereafter, at block 24 a magnitude and phase for the flicker fluctuation is determined. Finally at block 26, the image is adjusted for the flicker fluctuation based on the power frequency, magnitude, and phase of the ambient light.

Determination of Power Frequency at Block 22

There are two matches for the power frequency, viz. 50 Hz or 60 Hz. Thus in order to determine the power frequency, in one embodiment differences between images taken at exposure times matched to possible choices (50 Hz or 60 Hz) for the power frequency are compared as follows. First two sets of images under the ambient or AC powered light are taken. Each set consists of two images shot of the same scene. For simplicity of discussion, assume the first images are taken at time 0, while the second images are taken at time $\alpha_1$ and $\alpha_2$, respectively. Let $\omega_1 = 2\pi \cdot 60$ and $\omega_2 = 2\pi \cdot 50$ The exposure times are given by $T_1 = k\pi/\omega_1$ and $T_2 = k\pi/\omega_2$, where $T_1$ is the exposure time for the first image and $T_2$ is the exposure time for the second image, and where k is an integer number set to be suitable for the light condition. Further $\alpha_1$ and $\alpha_2$ are selected so that $$\alpha_1 \neq k\pi/\omega_1 \text{ and } \alpha_2 \neq k\pi/\omega_2$$

Based on the foregoing, either the first and second image in the first set will be identical, or the first and second image in the second set will be identical, depending on whether the power frequency is 50 Hz or 60 Hz. In practice, noise and possible motion would introduce small differences between the two images. Thus, in one embodiment the images are adjusted for motion using a motion compensation technique before comparing the images. However, if the exposure time is matched to the wrong frequency, Equation (3) no longer holds and there should be a significant difference between the two images. In one embodiment, differences calculated from the two image sets are compared. The power frequency that gives the smaller error or difference is selected as the power frequency for the ambient light. It is to be appreciated that the use of 50 Hz and 60 Hz as possible choices of the power frequency of the ambient light is for illustrative purposes only and that techniques disclosed herein are applicable for other frequencies of ambient light.

Determination of Flicker Magnitude and Phase at Block 24

The flicker magnitude and phase, A and $\alpha$ in Equation (2), are difficult to estimate because the flicker term is not directly compared. There is also the signal term IT that differs at each pixel location. In order to remove the signal term, in one embodiment two images are taken. A first image is taken with the exposure set to be a full period of Y, $T_1 = \pi/\omega$. For the first image one of the images taken at block 22 may be used. Thereafter, a second image is taken with an exposure of a half period of Y, $T_2 = \pi/(2\omega)$. It is assumed that the first row of the first image is taken at time 0, and the first row of the second image is taken at time $\alpha_0$. In other words, the second image has an initial phase of $\alpha_0$.

Going back to the previous derivations for Case 1 and Case 2, when $T=\pi/(2\omega)$, Case 1:

$$Y(\alpha, T) = I \cdot T + \frac{A}{\omega}(2 - |\sin(\omega\alpha) + \cos(\omega\alpha)|),$$

$$\frac{2k\pi}{2\omega} \leq \alpha < \frac{(2k+1)\pi}{2\omega} < \alpha + T \leq \frac{(2k+2)\pi}{2\omega}$$

Case 2:

$$Y(\alpha, T) = I \cdot T + \frac{A}{\omega}|\cos(\omega\alpha) - \sin(\omega\alpha)|,$$

$$\frac{(2k-1)\pi}{2\omega} \leq \alpha < \alpha + T \leq \frac{(2k+1)\pi}{2\omega}$$

After further derivations, the two cases may be combined to be:

$$Y(\alpha, T) = I \cdot T + \frac{A}{\omega} + \frac{A}{\omega}\left(\frac{1 - |\sin(\omega\alpha)| -}{|\cos(\omega\alpha)|}\right) \text{sign}[\sin(2\omega\alpha)], \quad (4)$$

$$T = \frac{\pi}{2\omega}$$

Compared to Equation (3), we obtain:

$$Z(\alpha) = Y\left(\alpha, \frac{\pi}{2\omega}\right) - \frac{1}{2}Y\left(\alpha, \frac{\pi}{\omega}\right) \quad (5)$$

$$= \frac{A}{\omega}(1 - |\sin(\omega\alpha)| - |\cos(\omega\alpha)|)\text{sign}[\sin(2\omega\alpha)]$$

$Z(\alpha)$ also has a period of $\pi/\omega$. It is to be noted that the new term Z is independent of the term IT. In other words, Z only depends on the flicker fluctuation and is independent of the actual signal at a pixel location. Therefore, the Z value should be identical for pixels in the same row. If the Z value of any pixel from each row, or the average Z value for each row is taken, a sequence values $Z(\alpha_n)$ and $\alpha_n = n\beta + \alpha_0$ may be obtained, where n is the row number, $\beta$ is the time difference between the read-outs of two consecutive rows, and $\alpha_0$ is the initial phase for the first row.

In one embodiment $\alpha$ may be estimated by finding the zero crossings of Z. Since Z<0, when $$\frac{(2k)\pi}{2\omega} < \alpha < \frac{(2k+1)\pi}{2\omega}$$

Z=0 and going from negative to positive, when $$\alpha = \frac{(2k+1)\pi}{2\omega}$$

Z>0, when $$\frac{(2k+1)\pi}{2\omega} < \alpha < \frac{(2k+2)\pi}{2\omega}$$

Z=0 and going from positive to negative, when $$\alpha = \frac{(2k+2)\pi}{2\omega}$$

Therefore, by determining the zero crossing and the direction where Z is going, the value of $\alpha$ at that location may be estimated as follows. If Z is zero and going from negative to positive, then:

$$\alpha = \frac{(2k+1)\pi}{2\omega} = (n+u)\beta + \alpha_0$$

where k is an integer, n is an integer number of pixel width, u is a fraction of one pixel width. Since Z is periodic, the effective value $\alpha_0$ is limited to $0 \leq \alpha_0 < \pi/\omega$. That constraint eliminates k from the equation so that $\alpha_0$ can be estimated. Similarly $\alpha_0$ may be estimated if Z is zero and going from positive to negative.

Since equation (5) has a maximum and minimum value of $$Z_{max} = \frac{A}{\omega}(\sqrt{2}-1) \text{ and } Z_{min} = -\frac{A}{\omega}(\sqrt{2}-1), Z_{max} = -Z_{min} \quad (6)$$

In one embodiment the maximum values and minimum values in the Z sequence are found, and A is calculated from Equation (6). Of course, this is only an approximation because the Z sequence is a set of discreet samples of the actual Z curve. Another technique for determining A is to use estimated $\alpha_0$ value and recalculate A from Equation (5). In one embodiment, the values at different pixel locations are averaged to get a more accurate estimate. In one embodiment, the results from both of the methods for determining A are combined.

Row Averages

One way to calculate Z values is to calculate Equation (5) at every pixel. To obtain a sequence of Z with respect to $\alpha$, in one embodiment a Z value from each row is selected. In another embodiment an average of the Z values for each pixel is determined and used as the Z value for that row. Since the subtraction of Y values in Equation (5) is a linear operation, in one embodiment the pixel values in each row are averaged first before calculating the Z values. Using the row averages can save a large amount of memory. Instead of storing Z values for the entire image, only a column of Z values is needed. It can also speed up the processing because Z values at each pixel location need not be calculated. In general, using the row average reduces the noise and gives more accurate estimates.

Average of Z Values over Multiple Periods

Since Z is a periodic function, the entire sequence of Z values need not be analyzed. Thus, in one embodiment, just one period of the Z sequence is calculated. In another embodiment better an average of all the periods is calculated to smooth out the noise. To average over all periods, in one embodiment a conversion is performed to convert the unit of the period in time expressed in seconds to number of rows using the equation:

$$\frac{\pi}{\omega} = m\beta$$

where $\beta$ is the shutter time delay between two consecutive rows, and m is the length of the period for the Z sequence in terms of number of rows. For a rolling shutter, the exposure time is usually set in terms of number row delays. For an exposure time set to be half period of the AC power, the following relationship holds:

$$n\beta = \frac{\pi}{\omega} = m\beta$$

where n is the number of rows being exposed. It will be observed that m is same as n, the number used to set exposure time.

Smoothness and Noise Removal

In practice, image data is usually noisy. Thus in one embodiment a smoothing or noise removal step may be performed. Typical smoothing methods include Gaussian filtering, rectangular window filtering, median filtering, etc. First, the row averages are filtered along the vertical direction. Then after Step 2b where an average over all the periods is determined, the Z averages are smoothed. Usually the longer the filter length, the smoother is the data, allowing the initial phase $\alpha_0$ to be estimated more accurately. In one embodiment, filters of various lengths are used. Shorter ones are used to estimate A, while longer ones are used to estimate $\alpha_0$.

Estimation of the Zero Crossing Locations

Often, a zero crossing for the Z function may fall in between two pixels in which case, in one embodiment an interpolation operation is performed to obtain the pixel value of the Z function at the zero crossing. The interpolation operation may be a linear interpolation between the two closest pixels that span the zero crossing. For example if the zero crossing p lies in between point $p_1$ and $p_2$ with the corresponding Z values $Z_1$ and $Z_2$, p may be estimated by:

$$p = p_1 + |Z_1|/(|Z_1|+|Z_2|)$$

For each period, there are two zero crossing values, one going from negative to positive and the other from positive to negative. These points are half a period apart. Suppose the two points are labeled as $q_1$ and $q_2$, and $q_1 < q_2$. Thus, the zero crossing results may be verified by the by the following condition:

$$q_2 - q_1 - \frac{\pi}{\omega} < \text{thresh} \cdot \frac{\pi}{\omega}$$

where thresh could be set to, for example 5%, for a high confidence in the result. The final value of $q_1$ may be further adjusted by the average of the two:

$$(q_2 - \frac{\pi}{\omega} + q_1)/2$$

In one embodiment an adjustment for $q_2$ is performed which is similar to the adjustment for $q_1$ Adjusting the Image for Flicker Fluctuation at Block 24

In one embodiment, having determined the flicker magnitude and the initial phase in accordance with the above techniques, the flicker reduction logic 18 at block 24 adjusts for flicker artifacts on any images taken with an exposure time that is not an integer multiple of the half period of the AC power. Theoretically, the estimated values can be applied to all subsequent frames, if the light condition is not changing and the internal clock is accurate. However, over time error accumulates, and in one embodiment the magnitude and phase are re-estimated periodically or when lighting conditions change.

In one embodiment, adjusting an image for flicker artifacts includes, calculating the flicker varying term in Case 1 and Case 2 for each row and subtracting that term from each pixel in that row. The resulting image may be dimmer than the original image. Thus, in one embodiment a constant may be added to the pixels in each row so that the two images have the same average intensity.

What is claimed is:

1. A method for controlling artifacts in an image due to a presence of flicker in ambient light, comprising:

determining a power frequency for the ambient light;
determining a magnitude and phase of flicker fluctuation in the image due to the flicker comprising:
    capturing a first image at an exposure time $T_1=\pi/\omega$;
    capturing a second image at an exposure time $T_2=\pi/(2\omega)$;
    determining a function $Z(\alpha)$ defined as $$Z(\alpha) = Y\left(\alpha, \frac{\pi}{2\omega}\right) - \frac{1}{2}Y\left(\alpha, \frac{\pi}{\omega}\right),$$

where $$Y\left(\alpha, \frac{\pi}{2\omega}\right) \text{ and } Y\left(C, \frac{\pi}{\omega}\right)$$

are corresponding pixel values in the second and first images respectively, $\alpha$ is the phase of the flicker fluctuation, and
    $\omega=2\pi f$ where f is the power frequency of the ambient light; and
    deriving the magnitude and phase of the flicker fluctuation based on the Z function; and
adjusting the image for the flicker fluctuation based on the power frequency, magnitude, and phase.

2. The method of claim 1, wherein determining the power frequency comprises comparing differences between images taken at exposure times matched to possible choices for the power frequency.

3. The method of claim 2, wherein comparing the differences comprises calculating a first difference between two images taken at an exposure time matched to a 50 Hz power frequency, calculating a second difference between two images taken at an exposure time matched to a 60 Hz power frequency, and comparing the first difference to the second difference.

4. The method of claim 3, wherein if the first difference is less than the second difference, then the power frequency is determined to be 50 Hz.

5. The method of claim 3, wherein if the first difference is greater than the second difference, then the power frequency is determined to be 60 Hz.

6. The method of claim 1, further comprising adjusting the images for motion compensation prior to comparing the differences in the images.

7. The method of claim 6, wherein deriving the magnitude and phase of the flicker fluctuation comprises estimating the phase $\alpha$ of the flicker fluctuation using the equation $$\alpha = \frac{(2k+1)\pi}{2\omega} = (n+u)\beta + \alpha_0 \text{ if } Z = 0$$

and is going from negative to positive; where n represents a pixel row number, $\beta$ is a difference between read-outs of two consecutive pixel rows, and $\alpha_0$ the initial phase for the first pixel row.

8. The method of claim 6, wherein deriving the magnitude and phase of flicker fluctuation comprises estimating the phase $\alpha$ of the flicker fluctuation using the equation $$\alpha = \frac{(2k+2)\pi}{2\omega} = (n+u)\beta + \alpha_0 \text{ if } Z = 0$$

and is going from positive to negative; where n represents a pixel row number, $\beta$ is a difference between read-outs of two consecutive pixel rows, and $\alpha_0$ is the initial phase for the first pixel row.

9. The method of claim 6, wherein deriving the magnitude and phase of the flicker fluctuation comprises finding maximum and minimum points $Z_{max}$ and $Z_{min}$, respectively in the Z function and solving for the amplitude A using the equations.

$$Z_{max} = \frac{A}{\omega}(\sqrt{2} - 1)$$
$$Z_{min} = -\frac{A}{\omega}(\sqrt{2} - 1)$$
$$Z_{max} = -Z_{min}.$$

10. The method of claim 9, wherein deriving the magnitude and phase of the flicker fluctuation determining $\alpha_0$, the initial phase for the first pixel row as per claims 8 or claim 9, and solving for the amplitude A using the equation $$Z(\alpha) = Y\left(\alpha, \frac{\pi}{2\omega}\right) - \frac{1}{2}Y\left(\alpha, \frac{\pi}{\omega}\right)$$
$$= \frac{A}{\omega}(1 - |\sin(\omega\alpha)| - |\cos(\omega\alpha)|) \text{sign}[\sin(2\omega\alpha)].$$

11. The method of claim 6, wherein the determining the function $Z(\alpha)$ comprises averaging multiple periods of the function $Z(\alpha)$ to smooth out noise.

12. The method of claim 1, wherein the determining the function $Z(\alpha)$ comprises averaging the values $$Z(\alpha) = Y\left(\alpha, \frac{\pi}{2\omega}\right) - \frac{1}{2}Y\left(\alpha, \frac{\pi}{\omega}\right)$$

for each pixel row.

13. The method of claim 1, wherein the determining the function $Z(\alpha)$ comprises determining the values $$Z(\alpha) = Y\left(\alpha, \frac{\pi}{2\omega}\right) - \frac{1}{2}Y\left(\alpha, \frac{\pi}{\omega}\right)$$

for one period of the function $Z(\alpha)$.

14. The method of claim 1, wherein adjusting the image for the flicker fluctuation comprises determining a flicker term based on the power frequency, magnitude, and phase of the ambient light for each pixel row in the image, and subtracting the flicker term from each pixel in the row.

15. The method of claim 1, further comprising adding a constant to each pixel in the row to compensate for a loss in brightness.

16. The method of claim 1, wherein determining the magnitude and phase of flicker fluctuation in the image due to the flicker is performed periodically.

17. An image processor, comprising:

an image buffer to store image data for a captured image; and flicker reduction logic to determine a power frequency for ambient light; to determine a magnitude and phase of flicker fluctuation in the image data due to the flicker; and to adjust the image data for the flicker fluctuation based on the power frequency, magnitude, and phase; wherein determining the magnitude and phase of the flicker fluctuation in the image due to the flicker comprises capturing a first image at an exposure time $T_1 = \pi/\omega$;

capturing a second image at an exposure time $T_2 = \pi/(2\omega)$;

determining a function $Z(\alpha)$ defined as $$Z(\alpha) = Y\left(\alpha, \frac{\pi}{2\omega}\right) - \frac{1}{2} Y\left(\alpha, \frac{\pi}{\omega}\right),$$

where $$Y\left(\alpha, \frac{\pi}{2\omega}\right) \text{ and } Y\left(C, \frac{\pi}{\omega}\right)$$

are corresponding pixel values in the second and first images respectively, $\alpha$ is the phase of the flicker fluctuation, and $\omega = 2\pi f$ where f is the power frequency of the ambient light; and deriving the magnitude and phase of the flicker fluctuation based on the Z function.

18. The image processor of claim 17, wherein the flicker reduction logic determines the power frequency by comparing differences between images taken at exposure times matched to possible choices for the power frequency.

19. A camera system, comprising:

camera optics;

an image sensor positioned so that light passing through the camera optics impinges on the image sensor; and an image processor coupled to the image sensor to receive image data for a captured image therefrom, wherein the image processor comprises flicker reduction logic to determine a power frequency for the ambient light; to determine a magnitude and phase of flicker fluctuation in the image data due to the flicker; and to adjust the image data for the flicker fluctuation based on the power frequency, magnitude, and phase; wherein determining the magnitude and phase of the flicker fluctuation in the image due to the flicker comprises capturing a first image at an exposure time $T_1 = \pi/\omega$;

capturing a second image at an exposure time $T_2 = \pi/(2\omega)$;

determining a function $Z(\alpha)$ defined as $$Z(\alpha) = Y\left(\alpha, \frac{\pi}{2\omega}\right) - \frac{1}{2} Y\left(\alpha, \frac{\pi}{\omega}\right),$$

where $$Y\left(\alpha, \frac{\pi}{2\omega}\right) \text{ and } Y\left(C, \frac{\pi}{\omega}\right)$$

are corresponding pixel values in the second and first images respectively, $\alpha$ is the phase of the flicker fluctuation, and $\omega = 2\pi f$ where f is the power frequency of the ambient light; and deriving the magnitude and phase of the flicker fluctuation based on the Z function.

* * * * *